Patented Aug. 4, 1953

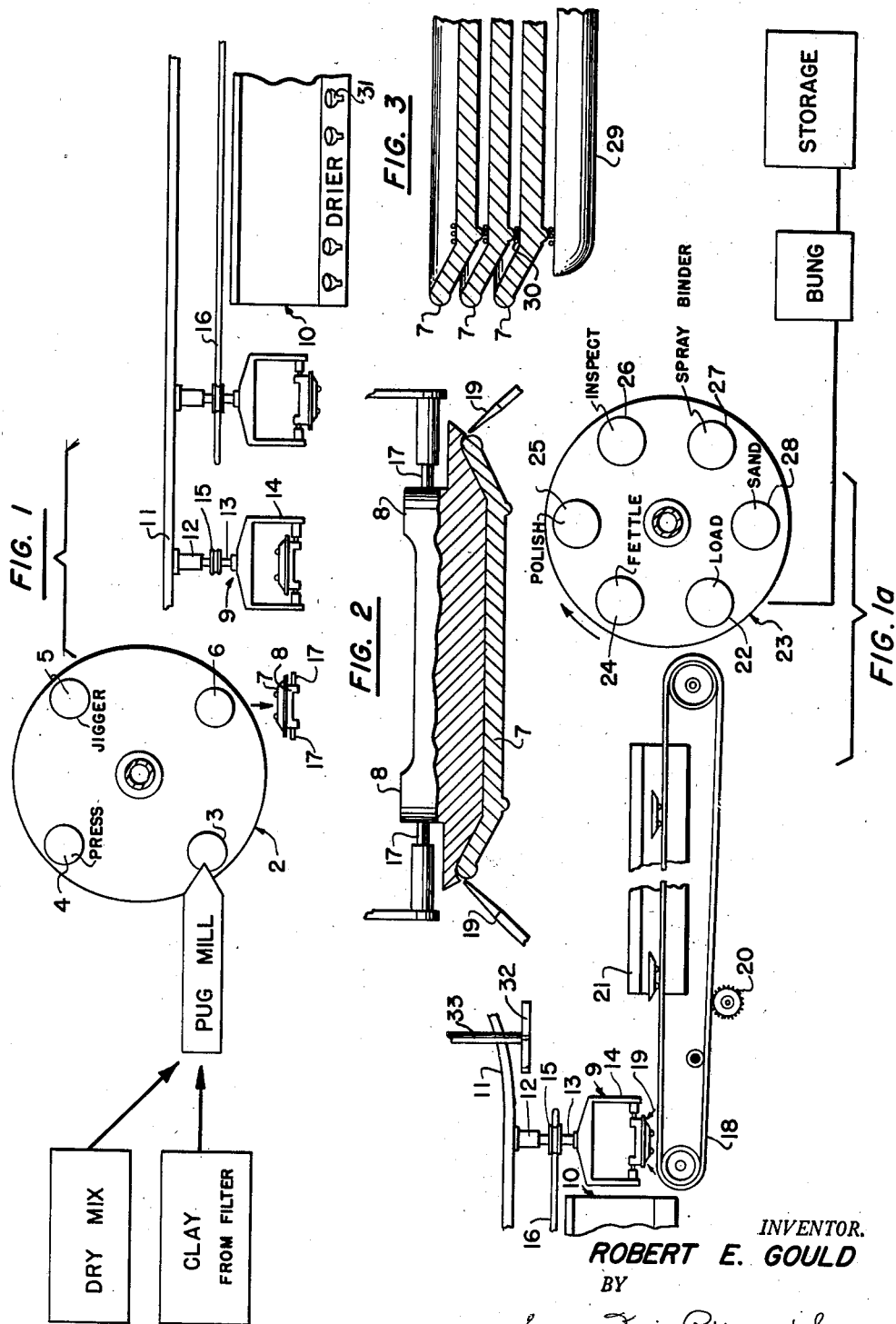

2,647,295

UNITED STATES PATENT OFFICE 2,647,295

METHOD AND APPARATUS FOR MANUFACTURE OF POTTERY

Robert E. Gould, East Aurora, N. Y.

Application September 20, 1948, Serial No. 50,056

26 Claims. (Cl. 25—22)

This invention relates to a method and apparatus for the manufacture of pottery and more particularly to a method of drying ware employing a new sequence of manufacturing operations.

In the usual method of manufacturing pottery, clay in a plastic state is placed on absorbent molds. The clay is generally pressed to approximately the desired shape and size and then jiggered for the final shaping operation. The ware, while still on the mold, is removed from the jiggering machine and sent to a drier with the ware resting on the upper surface of the mold. The adhesive forces between the mold and the jiggered ware and the weight of the ware hold the ware firmly to the mold during the drying operation. When the ware has been dried to a moisture content of approximately 10–12%, the adhesive forces between the ware and the mold have been eliminated and the ware may be lifted from the mold for further processing.

The method described above has certain inherent disadvantages. Of primary importance is the long time required for the drying operation. Ordinarily, 2½–3½ hours are required for the drying of the ware, making it necessary to have driers of large capacity and requiring a lag between the jiggering of the ware and the operations following the drying step. Because of the long time required for drying, the driers must be operated at a relatively low temperature to prevent overheating of the mold and causing the material, usually plaster of Paris, of which the mold is made to lose its water of crystallization. The low temperature of drying in turn further prolongs the period required to dry the ware.

During the drying processes heretofore employed the plaster of Paris mold absorbed a large part of the moisture removed from the ware. It then became necessary to dry the mold before it could be used in the shaping of another piece of ware. Ordinarily a mold could be used only twice in an 8-hour shift and then had to be rather thoroughly dried before further use.

Care must be taken in removing ware having 10–12% moisture from the mold. The ware is fragile and may not be straightened without danger of cracking if deformed. Moreover, the fragile nature of the ware made careful handling necessary after its removal from the mold and generally made it necessary to perform finishing and polishing operations by hand.

It is an object of this invention to provide a method which will greatly reduce the time required for the drying of jiggered and pressed ware, thereby eliminating any lag in the sequence of manufacturing operations between the jiggering operation and operations subsequent to the drying operation.

Another object of this invention is to reduce the amount of moisture absorbed by the absorbent mold during the drying of the ware and thereby allow more frequent use of the molds.

A further object of this invention is to provide a method which will allow straightening of ware to eliminate any deformities in the ware after it is removed from porous molds.

A further object of this invention is to provide a sequence of operations in which the ware is dried to a low moisture content prior to the bisque firing step.

It is also an object of this invention to provide a sequence of operations permitting a novel method of bunging ware for bisque firing.

With these and other objects in mind which will become apparent in the following detailed description this invention resides in a method and apparatus for rapidly drying ware by rotating the ware on absorbent molds in an inverted position as it passes through a drier. The mold and ware are separated while the ware still has a relatively high moisture content after which the ware is dried to a very low moisture content to produce strong ware which may be finished and bunged in automatic machinery.

In the drawings:

Figure 1 is a schematic flow sheet partly in elevation and partly in plan illustrating the sequence of operations in this invention.

Figure 1A is a continuation of Figure 1 illustrating the second drying step and the fettling, polishing and bunging operations.

Figure 2 is a detailed cross-sectional view of the ware and the mold employed in this invention.

Figure 3 is a sectional view of the pottery ware illustrating the method of stacking the ware for bisque firing.

A dry clay mixture or clay from filter presses is introduced with the water into a pug mill 1 to form a plastic material. The clay having the proper composition and moisture content to give it the desired characteristics for pressing and jiggering operations is discharged from the pug mill to a combination pressing and jiggering machine indicated generally by 2.

The jiggering machine 2 may be of any of a number of standard types employed in the pottery ware industry and may be adapted for the manufacture of flat or hollow ware. Generally these machines consist of an intermittently rotating table which carries absorbent, porous molds supported on rotatable chucks successively to stations where the pressing and jiggering operations are performed. The machine 2 schematically illustrated in the drawings has a station 3 to which clay is delivered from the pug mill directly onto the mold. The table is then rotated and the mold to which the clay mixture has been added is moved to station 4 and another mold is positioned at station 3 to receive a charge of clay. At station 4 a press beats or squeezes the clay over the surface of the mold to preform the clay prior to jiggering. The table again rotates and the mold is carried to the jiggering position indicated by 5. At this station the mold is rotated on the chuck and the ware is tooled to the desired shape. The next rotation of the table carries the mold to the loading station 6 where it is removed from the chuck and another mold is put in its place to repeat the operations. A similar sequence of operations could be performed on a continuously rotating jiggering machine.

The jiggered ware 7 which is still on the mold 8 is placed on a conveyor 9 to be transported through a drier 10. The conveyor 9 may be of any suitable type, but must be adapted to carry the mold and ware in an inverted position and rotate them as they pass through the drier. The conveyor 9 illustrated in the drawings is supported on a track or chain 11 which may pass through the drier or, as shown in the drawings, be adapted to move the conveyor 9, and, consequently, the ware 7, through the drier without the track being subjected to the high temperatures in the drier.

A bearing 12 at the upper end of the conveyor 9, directly below its connection with the track 11, rotatably supports a shaft 13. A hanger 14 of the conveyor, which supports the ware 7 and mold 8, is connected to the lower end of the shaft 13. Secured to shaft 13 is a sheave 15 which engages a belt 16 to rotate the hanger 14 as the conveyor 9 passes through drier 10.

In the drawings the mold 8 is shown supported in hanger 14 by means of lugs 17 extending from the body of the mold 8. These lugs are spaced from the center of gravity of the mold and ware, remote from the ware 7, and cause the mold 8 and ware 7 to turn over and hang in an inverted position when supported by the hanger 14. Any suitable means for supporting the ware 7 in the conveyor 9 in an inverted position may, of course, be employed. The structure illustrated merely makes it unnecessary to invert the mold as it is placed in the conveyor.

Belt 16 will, in most cases, be motor driven to engage the sheave 15 and rotate the mold while it is passing through the drier at a speed of about 20–200 R. P. M. The purpose of rotating the mold is merely to allow uniform heating of the mold 8 and the ware 7 as it passes through the drier 10. It is not necessary to rotate the molds at a high speed since no effort is made to increase the rate of drying by, for example, centrifugal forces resulting from the rotation although some benefits may possibly result therefrom. Sheave 15 could, of course, engage a stationary track supported over the drier 8 and the rotation be produced as the result of the forward movement of the conveyor through the drier.

Drier 10 is of any type adapted to allow rapid drying of the ware. A drier relying on infrared rays from infrared heaters 31 to heat the ware and evaporate moisture therefrom has been found highly satisfactory. Infrared driers are advantageous in allowing the heat to be directed against the ware without heating the entire mold. For example, a source of infrared heat may be seated along the floor of the drier 10 and the ware shades the body of the mold. As a result, the mold 8 is maintained at a relatively low temperature even though the ware is subjected to a high temperature drying operation. The moisture is evaporated from the lower surface of the ware at a rapid rate to produce a high gradient in the moisture content from the upper to the lower surface of the ware. While the advantages of the invention are realized to the greatest extent in infrared driers, the rapid drying of the ware 7 and the advantages resulting therefrom can be obtained in any of the conventional driers used in the manufacture of pottery.

The short time required for the mold 8 to pass through the drier 10 allows the maintenance of high temperatures therein without danger of over-heating the molds and causing loss of the water of crystallization in the plaster of Paris. The large mass of the mold and the rotation of the mold as it passes through the drier also combine to equalize the heating of the mold 8 and prevent any local over-heating of the plaster of Paris.

The ware 7 emerges from the discharge end 17 of the drier 10 having a moisture content of approximately 14–16% water. This is in contrast with the processes of the prior art in which the ware was dried on the mold 8 to a moisture content of 11–12%. Ordinarily, the drying operation described above is completed in 4 to 6 minutes from the time the ware enters the drier until it is discharged therefrom, whereas 2½ to 3½ hours were required in prior processes.

Without wishing to be bound by any theory it is believed that the rapid drying is the result of the following factors. In the first place, the moisture content of the ware is only reduced from 20 to approximately 14–16% water. The difficulty in removing water from the ware as the moisture content of the ware increases rapidly as the moisture content decreases. By interrupting the drying operation and separating the ware from the mold, while the ware has a high moisture content, the time the ware is in contact with the mold is greatly reduced.

Another reason for the rapid drying is the high rate of heat input into the ware. This high rate of heating allows the lower surface of the water to reach a relatively high temperature and result in rapid evaporation of moisture from that surface. The rapid evaporation produces a large gradient in the moisture content from the ware with its lower surface in contact with the mold and causes rapid diffusion of moisture to the lower surface of the ware. Another reason for the rapid drying is that the capillary forces drawing the water to the lower surface of the ware are aided by gravity, whereas in prior methods any capillary forces drawing moisture to the exposed surface of the ware were opposed by gravity.

One of the most important advantages resulting from the new method of drying is the reduction of the amount of water absorbed by the molds and the elimination of overheating the molds. The greatly reduced time during which the mold is in contact with the ware naturally reduces the amount of moisture absorbed from the ware and prevents overheating of the mold even though the drier operates at a high temperature. The very high gradient in the moisture content across the ware causes the moisture to diffuse to the lower surface of the ware rather than towards the mold. Moreover, any capillary effects tending to pull moisture into the mold must operate against the forces of gravity rather than with the force of gravity as is the case when the drying is not performed with the molds in inverted position. It is, as a result, possible to repeat the cycle of pressing, jiggering, and drying, through which the mold passes, every 6 to 10 minutes.

As conveyor 9 emerges from the discharge end 17 of the drier the ware 7 is supported a short distance, in the order of a few hundredths of an inch or less, above a flat conveyor belt 18. The ware is then removed from the mold by spokes 32 mounted on a rotating shaft 33 striking the bearing 12 by vibration of the mold or the introduction of air from jets 19, see Figure 2, between the ware 7 and the mold 8. The vibration or the jets of air are sufficient to overcome the adhesive forces joining the ware 7 and the mold 8 and cause the ware to drop on the moving conveyor belt 18. The conveyor 9 continues to move along above the ware and is gradually lifted by the curve in track 11 to lift the mold from the ware. In the present method the weight of the ware opposes the adhesive forces joining the mold and the ware and greatly facilitates the removal of the ware from the mold. The molds are returned by the conveyor 9 for use in machine 2.

The ware, after its removal from the mold, is in a slightly plastic condition and may be straightened to correct any deformities which may have developed. Such a straightening operation is not possible after separation of the ware from the mold in the prior processes because of the low water content of the ware. However, since it is not necessary to lift the ware from the mold in the present process, deformation of the ware is an infrequent occurrence.

Since the ware separated from the mold is in a plastic condition, conveyor 18 should have a flat, smooth surface to prevent deformation of the ware. In most cases conveyor 18 should be of a heat conducting material such as steel to allow heat to be conducted from the conveyor to the ware in the subsequent drying step. In the drawings, the conveyor is illustrated with a brush 20 adapted to clean its surface prior to the dropping of the ware thereon.

Conveyor 18 transports the ware through a second drier 21 in which the moisture content of the ware is reduced to as low a value as possible. Ordinarily the moisture content will be 2–5%. Since the molds 8 do not pass through the second drier 21, this drier may operate at very high temperatures to allow rapid removal of the moisture from the ware without affecting the mold. The ware discharged from the drier has a high physical strength, resulting from its low moisture content, and may be mechanically finished and polished.

The ware discharged from the drier 21 is taken from the conveyor belt 18 and loaded at loading station 22 on rotating chumbs on an intermittently rotating finishing machine 23. The chumbs carry the ware in succession to a series of stations at which various finishing operations are performed. The number of finishing operations, or the number of steps employed to perform the operations may be varied depending on the particular ware. In the machine illustrated in the drawings after the ware is centered on the chumb it is moved to position 24. At this position the chumb rotates about its vertical axis to turn the ware centered thereon and a tool is directed against the edge of the ware to fettle the edge to remove any feather of dried ware which may have resulted from the jiggering operation. As the fettling operation takes place at station 24, another piece of ware is centered on a chumb at loading station 22.

Upon completion of the fettling operation the intermittently rotating table 23 turns to position the ware at station 25. At this station the surface of the ware is polished with a dry flannel cloth or steel wool to remove any slight irregularities in its surface. The value of drying the ware to approximately 2–5% moisture content is illustrated by the changes made possible in the polishing of the surface of the ware. In the prior processes in which the ware is removed from the mold having a moisture content of 10–12%, the ware is polished by hand with a damp sponge. It was necessary to have moisture present to form, in effect, a slurry with the clay particles removed from the ware in the polishing operation. The sponge then soaked up the slurry to remove it from the surface of the ware. Since the sponge becomes clogged with the slurry and must be cleaned frequently, a polishing operation involving the addition of moisture is not suitable for automatic operations.

The greater hardness and strength of the ware having a moisture content in the region of 2–5% allows polishing in the absence of water without scoring the ware. Any particles removed by the steel wool, horsehair, or dry flannel polishing medium is in the form of a dust which does not clog the cleaning medium. The absence of water and the greatly increased strength of the ware make satisfactory mechanical polishing operations feasible.

Upon completion of the polishing operation the machine 23 again rotates to move the ware to station 26 where it is inspected for edge cracks. However, the method of dropping the ware from the mold results in fewer strains in the ware and a corresponding reduction in the number of edge cracks than the conventional processes hitherto available.

Further rotation of machine 23 moves the ware to station 27 at which it is sprayed with a binder. The purpose of the binder is to hold sand firmly to the surface of the ware during the bisque firing step. In the present process it is only necessary to apply the binder on the part of the surface of the ware which will ordinarily be in contact with other pieces of the ware when the ware is stacked.

After the application of the binder, sand, or other neutral refractory parting agent, may be applied to the ware at the same station or upon the rotation of the machine 23 to bring the ware to the position 28. It will generally be desirable to direct a blast of air against the ware after the sanding operation to remove any excess sand. Further rotation of the machine 23 returns the ware to the loading station 22 at which station the ware is removed from the chumb and a new piece of ware from drier 21 is placed in position for the finishing operations.

The ware removed from the finishing machine 22 is bunged by putting one piece of ware 7 directly on a setter 29 which has been sanded to prevent the ware from sticking thereto. Other pieces of ware are then stacked on the piece of ware resting on the setter to form a nested mass of ware ready for bisque firing. A layer of sand 30 from the sanding operations at stations 27 and 28 separates adjacent pieces of ware to prevent them from fusing together during the bisque firing operation. After the bunging operation the ware is delivered to storage or directly to bisque or other kiln cars.

The finishing procedure described above, made possible by the novel sequence of operations, places the ware in a condition and position for the sanding operation. As the chumb rotates in position the binder and sand are readily applied, and the excess sand may be removed with a blast of air without danger of marring the ware. The bunging operation, in which the ware, with the parting agent adhering to its surface is merely stacked, is greatly simplified over prior processes in which it was necessary to pack sand between adjacent pieces of ware.

A method of manufacturing pottery has been described herein which allows the time required for drying jiggered pottery ware to be greatly reduced. It is, consequently, possible to eliminate the delay, and consequent necessity for storing a large number of molds, heretofore occurring between the jiggering operation and manufacturing operation subsequent to the drying of the ware. The method described allows the porous molds of the ware to be used as often as every 10 minutes, whereas the methods of the prior art allow the use of the mold about once in an 8-hour shift. The present method is also advantageous in reducing the disintegration of the molds by preventing their over-heating.

The unique drying procedure herein described makes possible a sequence of operations novel in the pottery industry. Drying of the ware to a low moisture content gives the ware sufficient strength and hardness to withstand the shock and stresses occurring in mechanical finishing operations. Moreover, polishing of the unfired ware in the absence of moisture readily lends itself to an automatic, mechanical operation.

The ware produced by the present method is of higher quality than ware produced by the prior methods because of the fewer strains developed in the ware as it is dropped from the mold by the novel method comprising a feature of this invention. It is also possible to correct deformities in the ware after it has been removed from the mold when the process herein described is employed.

I claim:

1. In a method of fabricating pottery ware in which clay is jiggered on porous molds to form the ware, the steps of inverting the mold with the ware thereon partially, drying the inverted ware while on the inverted mold, rotating the mold during the drying step whereby drying of the clay is equalized, and directing a jet of air between the ware and mold to separate the ware from the mold.

2. In a method of fabricating pottery ware in which clay is shaped on molds to form the ware, the steps of partially drying the ware to a moisture content of about 14–16%, said molds being rotated in an inverted position with the clay adhering to their lower surface during the drying whereby absorption of moisture by the molds is minimized and uniform drying of the clay is effected, removing the ware from the mold, and straightening the ware to eliminate deformities in the partially dried ware.

3. In a method of fabricating pottery ware in which clay is shaped on molds to form the ware, rotating the molds with the clay adhering to their lower surface in an inverted position to equalize the drying of the clay while passing through a drier, separating the ware having a moisture content of about 14 to 16% from the molds by dropping it a short distance onto a supporting surface, and then passing the ware separated from the molds through a second drier to dry the ware to substantially complete dryness.

4. In a method of fabricating pottery ware in which clay is shaped on molds to form the ware, rotating the molds with the clay adhering to their lower surface in an inverted position while passing through a drier to reduce the water content of the clay to about 14 to 16% in which the clay is in a plastic condition, dropping the ware from the molds a distance in the order of a few hundredths of an inch onto a supporting surface, straightening the ware while in the workable condition of 14 to 16% moisture, and then passing the ware separated from the molds through a second drier to dry the ware to substantially complete dryness.

5. A method of manufacturing pottery comprising jiggering clay to form the ware on an absorbent mold, rotating the mold in an inverted position with the ware adhering in its lower surface while passing through a drier to reduce the moisture content of the ware to about 14 to 16%, separating the ware from the mold by dropping the ware from the lower surface of the mold, drying the ware after separation from the mold to substantially complete dryness and firing the dried ware.

6. A method of manufacturing pottery comprising jiggering plastic clay to form the ware on an absorbent mold, drying the ware to a moisture content of about 14–16% while rotating the mold and ware in an inverted position whereby absorption of the mold is minimized, removing the ware from the mold, drying the ware to a moisture content ranging from about 2 to 5%, and firing the dried ware.

7. In a method of manufacturing pottery ware, the improvement comprising jiggering clay to form the ware on an absorbent mold, drying the ware to a moisture content of about 14–16% while rotating the mold and ware in an inverted position whereby absorption of moisture by the mold is minimized, removing the ware from the mold by dropping the ware a distance in the order of a few hundredths of an inch onto a supporting surface, straightening the ware while in the plastic condition of 14 to 16% moisture, drying the ware to a moisture content of less than 5%, and firing the dried ware.

8. In a method of manufacturing pottery ware, the improvement comprising shaping plastic clay to form the ware on an absorbent mold, inverting the mold whereby the ware is supported on the lower surface thereof, drying the ware to a moisture content of about 14 to 16%, separating the ware from the mold by dropping it a short distance onto a supporting surface, thereafter drying the ware to a moisture content of about 2 to 5%, polishing the surface of the dried ware and, applying a thin layer of sand on the surface of the ware to prevent contact between the surfaces of adjacent pieces of ware on stacking for bisque-firing.

9. In a method of manufacturing pottery ware, the improvement comprising shaping plastic clay to form the ware on an absorbent mold, inverting the mold whereby the ware is supported on the lower surface thereof, drying the ware to a moisture content of about 14 to 16%, separating the ware from the mold by dropping it a short distance onto a supporting surface, thereafter drying the ware to a moisture content of 2 to 5%, polishing the surface of the dried ware, applying a binder to the surfaces of the ware normally in contact when the ware is nested, sanding the ware, said binder holding a thin layer of the sand to the surface of the ware, and stacking the ware.

10. In a method of manufacturing pottery ware, the improvement comprising jiggering clay to form the ware on an absorbent mold, rotating the mold and ware in an inverted position while passing through a drier wherein the moisture content of the ware is reduced to about 14 to 16%, dropping the ware a short distance in the order of a few hundredths of an inch from the mold onto a conveyor belt, and drying the ware to about 2 to 5% moisture whereby the ware is hardened to a condition permitting mechanical edge fettling and polishing operations.

11. In a method of manufacturing pottery ware, the improvement comprising jiggering clay to form the ware on an absorbent mold, rotating the ware and mold in an inverted position while passing through a drier, said ware being dried to about 14-16% moisture, directing a jet of air between the mold and ware to drop the ware from the mold a short distance onto a heat conducting belt, drying the ware after removal from the mold to a moisture content of 2 to 5%, polishing the ware, and stacking the ware with a thin layer of sand separating the surfaces of adjacent pieces of ware which would normally be in contact on nesting the ware.

12. In a method of fabricating pottery ware in which clay is shaped on contoured faces of molds to form the ware, the step of passing the mold with the contoured surface of the ware facing downwardly with the shaped ware adhering thereto through a drying stage to dry the ware to a moisture content of about 14 to 16%, and separating the partially dried ware from the lower surface of the mold.

13. In a method of fabricating pottery ware, the steps of shaping plastic clay on a porous mold to form the ware, inverting the mold to a position with the ware adhering to its lower surface, passing the mold with the ware adhering thereto in the inverted position through a drying operation, whereby absorption of moisture by the mold is minimized, said drying operation reducing the water in the ware to about 14 to 16%, and then separating the ware from the inverted mold.

14. In a method of fabricating pottery ware in which clay is shaped on contoured surface of molds to form the ware, the step of passing the mold with the contoured surface facing downwardly with the shaped ware adhering thereto through a drying stage to rapidly dry the ware to a moisture content of about 14 to 16%, rotating the inverted mold and ware while passing through the drier to obtain uniform drying of the ware, and separating the partially dried ware from the lower surface of the mold.

15. In apparatus for fabricating pottery ware on porous molds having a contoured surface on which plastic clay ware is formed, a drying zone, a conveyor member for moving the molds with the formed ware adhering to the shaped surface through the drying zone, means on the conveyor to engage the molds and support them with the contoured surface downward and the ware adhering thereto as the molds are moved through the drying zone.

16. In apparatus for fabricating pottery ware on porous molds having a contoured surface on which plastic clay ware is formed, a drying zone, a conveyor member for moving the molds with the formed ware adhering to the shaped surface through the drying zone, means on the conveyor to engage the molds and support them with the contoured surface downward and the ware adhering thereto as the molds are moved through the drying zone, and means for rotating a mold in the inverted position as it travels through the drying zone.

17. In apparatus for fabricating pottery ware on porous molds having a contoured surface on which plastic clay ware is formed, a drying zone, a conveyor member for moving the molds with the formed ware adhering to the shaped surface through the drying zone, means on the conveyor to engage the molds and support them with the contoured surface downward and the ware adhering thereto as the molds are moved through the drying zone, a sheave on the conveyor member, and a driving member engaging the sheave as it travels through the drying zone to rotate the molds.

18. In apparatus for fabricating pottery ware on porous molds having a contoured surface on which plastic clay ware is formed, a drying zone, a conveyor member for moving the molds with the formed ware adhering to the shaped surface through the drying zone, means on the conveyor to engage the molds and support them with the contoured surface downward and the ware adhering thereto as the molds are moved through the drying zone, a second conveyor member directly below the inverted molds substantially at the end of the drying zone, and separating means for breaking the adhesion of the ware from the molds as the ware leaves the drying zone.

19. In apparatus for fabricating pottery ware on porous molds having a contoured surface on which plastic clay ware is formed, a drying zone, a conveyor member for moving the molds with the formed ware adhering to the shaped surface through the drying zone, said conveyor member so constructed and arranged as to engage the molds and support them with the contoured surface downward and the ware adhering thereto as the molds are moved through the drying zone, a second conveyor member directly below the inverted molds substantially at the end of the drying zone, and an air jet positioned against the outlet of the drier to direct air against the mold and ware to drop the ware from the mold onto the second conveyor.

20. In apparatus for fabricating pottery ware on porous molds having a contoured surface on which plastic clay ware is formed, a drying zone, a conveyor member for moving the molds with the formed ware adhering to the shaped surface through the drying zone, means on the conveyor to engage the molds and support them with the contoured surface downward and the ware adhering thereto as the molds are moved through the drying zone, a second conveyor member directly below the inverted molds substantially at the end of the drying zone, and a vibrator adapted to vibrate the mold to break the adhesion of the dried ware from the other mold and drops the ware on the second conveyor.

21. In apparatus for fabricating pottery ware on porous molds having a contoured surface on which plastic clay ware is formed, a drying zone, a conveyor member for moving the molds with the formed ware adhering to the shaped surface through the drying zone, means on the conveyor to engage the molds and support them with the contoured surface downward and the ware adhering thereto as the molds are moved through the drying zone, and infra-red heating members positioned in the drying zone to heat the lower surface of the ware.

22. In apparatus for fabricating pottery ware on porous molds having a contoured surface on which plastic clay ware is formed, a drying zone, a conveyor member for moving the molds with the formed ware adhereing to the shaped surface through the drying zone, said conveyor member so constructed and arranged as to engage the molds and support them with the contoured surface downward and the ware adhering thereto as the molds are moved through the drying zone, and a second conveyor member forming a platform for the reception of the ware as it is discharged from the drier, said second conveyor member having its upper surface spaced a few hundredths of an inch from the lower surface of the ware adhering to the molds.

23. In a method of manufacturing pottery ware, the improvement comprising shaping plastic clay on a contoured face of an absorbent mold to absorb the ware, rotating the mold and ware in an inverted position with the contoured face of the mold downward while passing through a drier wherein the moisture content of the ware is about 14 to 16%, separating the ware from the mold, and drying the thus separated ware to a moisture content of about 2 to 5% whereby the ware is hardened to a condition permitting polishing operations.

24. Apparatus for the manufacture of pottery ware comprising absorbent molds having a contoured face, means for shaping plastic clay on the contoured face of the absorbent molds, a first drier, a conveyor member for transporting the molds with the shaped ware adhering to the contoured surface thereof through the first drier with the contoured surface of the mold facing downwardly, means for rotating the molds as they pass through the drier, a conveyor positioned directly under the ware as it is discharged from the drier, means for separating the ware from the molds and dropping it onto the second conveyor member, and a second drier operating at a higher temperature than the first drier, said second conveying member transferring the ware separated from the mold through the second drier.

25. In a method of fabricating pottery ware in which plastic clay is shaped on a contoured surface of absorbent mold to form the ware, the step of supporting the mold with its contoured surface facing downwardly and the ware adhering thereto in a drying zone to partially dry the ware.

26. In a method of manufacturing pottery ware, the improvement comprising shaping plastic clay on the contoured surface of an absorbent mold to form the ware, drying the ware to a moisture content of about 14 to 16%, separating the ware from the mold, thereafter drying the ware to a moisture content of about 2 to 5%, polishing the surface of the dried ware, applying a binder to the surface of the ware normally in contact when the ware is stacked, placing sand on the surfaces of the ware, said bond holding a thin layer consisting essentially of sand to the surface of the ware, and stacking the ware for bisque firing.

ROBERT E. GOULD.

References Cited in the file of this patent

UNITED STATES PATENTS

| Number | Name | Date |
|---|---|---|
| 1,445,701 | Maynard | Feb. 20, 1923 |
| 1,600,286 | Lea | Sept. 21, 1926 |
| 1,739,151 | Johnson | Dec. 10, 1929 |
| 1,793,089 | Heyes | Feb. 17, 1931 |
| 1,948,091 | Alvery et al. | Feb. 20, 1934 |
| 1,977,704 | Vaughan et al. | Oct. 23, 1934 |
| 2,128,827 | Killian | Aug. 30, 1938 |
| 2,173,107 | Gould | Sept. 19, 1939 |
| 2,263,681 | Hart | Nov. 25, 1941 |
| 2,332,937 | Schmidberger | Oct. 26, 1943 |
| 2,349,292 | Miller et al. | May 23, 1944 |
| 2,353,256 | Maywald, Jr. | July 11, 1944 |
| 2,355,459 | Miskella | Aug. 8, 1944 |
| 2,359,879 | Schweitzer | Oct. 10, 1944 |
| 2,407,321 | Miller | Sept. 10, 1946 |
| 2,413,735 | Shabaker | Jan. 7, 1947 |
| 2,437,702 | Miller et al. | Mar. 16, 1948 |
| 2,454,708 | Middleton | Nov. 23, 1948 |
| 2,510,678 | Bower | June 6, 1950 |

OTHER REFERENCES

Ceramic Whitewares, Newcomb, 1947, page 119.

Manufacture of Earthenware, Sandeman, 1917, pages 158, 159, 161 and 162.

Searle: Encyclopaedia of the Ceramic Industries, vol. 2, 1930, pages 20 and 21.

Wilson, Clay Technology, 1927, pages 126, 134 and 135.